US011425572B2

(12) United States Patent
Eom et al.

(10) Patent No.: US 11,425,572 B2
(45) Date of Patent: Aug. 23, 2022

(54) ELECTRONIC DEVICE AND METHOD FOR CONTROLLING SAME

(71) Applicant: SAMSUNG ELECTRONICS CO., LTD., Gyeonggi-do (KR)

(72) Inventors: Chungyong Eom, Gyeonggi-do (KR); Dongik Lee, Gyeonggi-do (KR); Youngman Jung, Gyeonggi-do (KR); Jongmin Choi, Gyeonggi-do (KR); Junbum Shin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/265,084

(22) PCT Filed: Jul. 31, 2019

(86) PCT No.: PCT/KR2019/009510
§ 371 (c)(1),
(2) Date: Feb. 1, 2021

(87) PCT Pub. No.: WO2020/027561
PCT Pub. Date: Feb. 6, 2020

(65) Prior Publication Data
US 2021/0314777 A1    Oct. 7, 2021

(30) Foreign Application Priority Data
Aug. 3, 2018  (KR) .................. 10-2018-0090940

(51) Int. Cl.
*H04W 12/63* (2021.01)
*H04W 12/50* (2021.01)
(Continued)

(52) U.S. Cl.
CPC ............ *H04W 12/63* (2021.01); *H04B 11/00* (2013.01); *H04L 63/0853* (2013.01);
(Continued)

(58) Field of Classification Search
CPC ........... H04W 4/38; H04W 4/80; H04W 4/70; H04W 12/06; H04W 12/02; H04W 4/02;
(Continued)

(56) References Cited

U.S. PATENT DOCUMENTS 9,215,685 B2   12/2015  Gupta et al.
9,571,928 B2   2/2017   Seo et al.
(Continued)

FOREIGN PATENT DOCUMENTS

KR   1020150095510   8/2015
KR   1020150107096   9/2015
(Continued)

OTHER PUBLICATIONS

PCT/ISA/210 Search Report issued on PCT/KR2019/009510, dated Nov. 21, 2019, pp. 5.
(Continued)

*Primary Examiner* — Kwasi Karikari
(74) *Attorney, Agent, or Firm* — The Farrell Law Firm, P.C.

(57) ABSTRACT

Provided are an electronic device and a method for controlling same. In a method for controlling an electronic device, the strength of a signal transmitted by an external device and/or whether or not the electronic device is being used is confirmed during the execution of communication with the external device, information relating to the movement state of the external device is requested if the strength of the signal transmitted by the external device and/or whether or not the electronic device is being used satisfies a predetermined condition, authentication information for authenticating the external device is transmitted to the external device if the external device is determined to be moving on the basis of the information relating to the movement state of the external device, an ultrasonic signal is output on the basis of
(Continued)

the authentication information, and an authentication result in response to the ultrasonic signal may be received from the external device.

13 Claims, 9 Drawing Sheets

(51) Int. Cl.
| | | |
|---|---|---|
| H04B 11/00 | (2006.01) | |
| H04L 9/40 | (2022.01) | |
| H04W 4/02 | (2018.01) | |
| H04W 12/06 | (2021.01) | |
| H04B 17/318 | (2015.01) | |

(52) U.S. Cl.
CPC ........... *H04W 4/023* (2013.01); *H04W 12/06* (2013.01); *H04W 12/50* (2021.01); *H04B 17/318* (2015.01)

(58) Field of Classification Search
CPC ..... H04W 4/027; H04W 12/50; H04W 4/025; H04W 4/33; H04W 84/12; H04W 84/18; H04W 8/005; H04W 84/20
See application file for complete search history.

(56) References Cited

U.S. PATENT DOCUMENTS

| | | | |
|---|---|---|---|
| 9,634,757 B2 | 4/2017 | Huang et al. | |
| 9,917,653 B2 | 3/2018 | Kim | |
| 10,366,246 B2 | 7/2019 | Lee et al. | |
| 10,448,080 B1* | 10/2019 | Nijim | H04N 21/4367 |
| 2009/0156126 A1 | 6/2009 | Willis | |
| 2014/0357293 A1 | 12/2014 | Tsaur et al. | |
| 2014/0364056 A1* | 12/2014 | Belk | H04N 21/6547 455/41.1 |
| 2014/0370810 A1 | 12/2014 | Huang et al. | |
| 2015/0093990 A1 | 4/2015 | Lin | |
| 2015/0131539 A1* | 5/2015 | Tsfaty | H04W 8/005 370/329 |
| 2016/0027331 A1 | 1/2016 | Ding | |
| 2016/0291141 A1 | 10/2016 | Han et al. | |
| 2017/0295466 A1* | 10/2017 | Strutt | H04W 4/023 |
| 2019/0072661 A1 | 3/2019 | Jeon et al. | |

FOREIGN PATENT DOCUMENTS

| | | |
|---|---|---|
| KR | 1020160008920 | 1/2016 |
| KR | 1020160021179 | 2/2016 |
| KR | 1020160123790 | 10/2016 |
| KR | 1020170098112 | 8/2017 |
| KR | 1020170105827 | 9/2017 |

OTHER PUBLICATIONS

PCT/ISA/237 Written Opinion issued on PCT/KR2019/009510, dated Nov. 21, 2019, pp. 11.
"Free-space path loss", https://en.wikipedia.org/wiki/Free-space_path_loss, Jan. 26, 2021, pp. 7.
Ghose, Avik et al.,"BlueEye—A System for Proximity Detection Using Bluetooth on Mobile Phones", Session: PUCAA: 1st International Workshop on Pervasive Urban . . . .
Crowdsensing Architecture and Applications, UbiComp'13, Sep. 8-12, 2013, Zurich, Switzerland, pp. 1135-1142.
"Ultrasound", https://en.wikipedia.org/wiki/Ultrasound, Jan. 26, 2021, pp. 12.
"How accurate are Estimote iBeacons?", https://reparage.com/post/how-accurate-are-estimote-ibeacons, Jan. 26, 2021, pp. 5.
Korean Office Action dated Feb. 22, 2022 issued in counterpart application No. 10-2018-0090940, 7 pages.

* cited by examiner

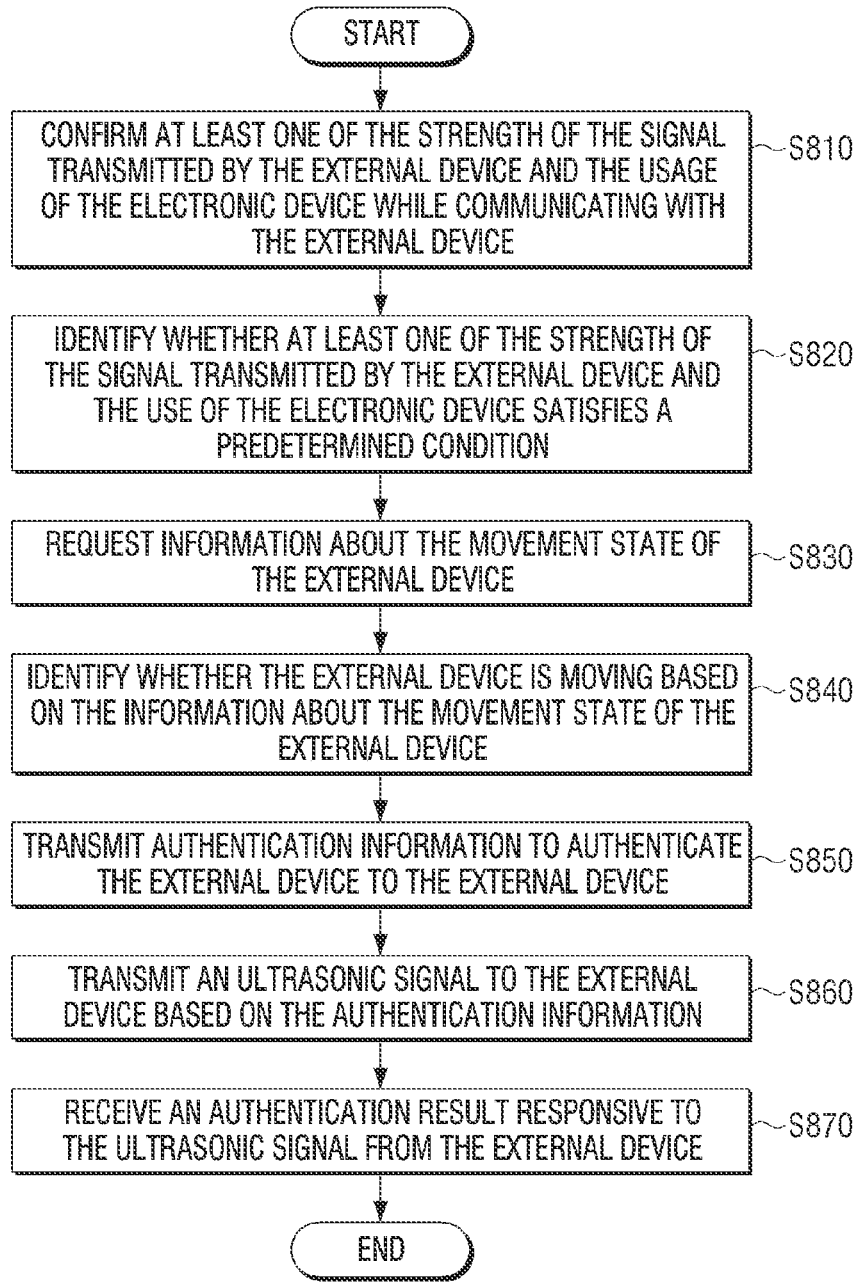

ELECTRONIC DEVICE AND METHOD FOR CONTROLLING SAME

PRIORITY

This application is a National Phase Entry of International Application No. PCT/KR2019/009510, which was filed on Jul. 31, 2019, and claims priority to Korean Patent Application No. 10-2018-0090940, which was filed in the Korean Intellectual Property Office on Aug. 3, 2018, the content of each of which is incorporated herein by reference.

TECHNICAL FIELD

This disclosure relates to an electronic device and a method for controlling same. More particularly, the disclosure relates to an electronic device for authenticating proximity of an external device and a method for controlling same.

BACKGROUND ART

In a related art, there are various ways to identify whether a user is in proximity to an electronic device using an external device (e.g., a smart phone, a wearable device, etc.) that is held by the user.

According to an example, there is a method for identifying the proximity of a user holding an external device based on a strength change of a signal transmitted by an electronic device to a communicator (e.g., Bluetooth, Wi-Fi, etc.) included in the external device. According to another example, there is a method for identifying the proximity of a user holding an external device by calculating a time of flight (TOF) that an ultrasonic signal transmitted by an electronic device arrives at an external device.

However, the method for identifying the proximity of a user holding an external device based on a change of signal strength has a possibility of error occurrence, and there is a problem of being vulnerable to signal distortion caused by channel attack. The method for identifying the proximity of a user holding an external device using a TOF has a problem of being vulnerable to sniffing.

There is a necessity to develop a method of identifying proximity of a user more safely and accurately in response to external attack.

DISCLOSURE

Technical Problem

The disclosure has been made to solve the above-described problems, and an object of the disclosure is to provide an electronic device which is capable of authenticating whether an external device is in proximity, based on information about whether an external device moves, which is received from an external device, and a method for controlling thereof.

Technical Solution

According to an embodiment, a method for controlling of an electronic device includes confirming at least one of a strength of a signal transmitted by an external device and whether the electronic device is being used during communication with the external device, based on at least one of the strength of the signal transmitted by the external device or whether the electronic device is being used satisfying a predetermined condition, requesting information relating to a movement state of the external device, based on the external device being identified as moving based on information on the movement state of the external device, transmitting authentication information for authenticating the external device to the external device, outputting an ultrasonic signal based on the authentication information, and receiving an authentication result in response to the ultrasonic signal from the external device.

According to another embodiment, an electronic device includes a communicator configured to perform communication using a wireless signal, a speaker configured to output an ultrasonic signal, a memory configured to store at least one instruction and a processor, connected to the communicator, the second communicator, and the memory, configured to control the electronic device, and the processor, by executing the at least one instruction, is further configured to confirm at least one of a strength of a signal transmitted by an external device and whether the electronic device is being used during communication with the external device, based on at least one of the strength of the signal transmitted by the external device or whether the electronic device is being used satisfying a predetermined condition, request information related to a movement state of the external device, based on the external device being identified as moving based on information on the movement state of the external device, control the communicator to transmit authentication information for authenticating the external device to the external device, control the speaker to output an ultrasonic signal based on the authentication information, and receive an authentication result in response to the ultrasonic signal from the external device.

Effect of Invention

According to various embodiments of the disclosure, the electronic device is capable of authenticating whether a user holding an external device is in proximity, more safely and accurately.

DESCRIPTION OF DRAWINGS

FIG. 8 is a flowchart illustrating a controlling method of an electronic device according to an embodiment.

BEST MODE FOR CARRYING OUT THE INVENTION

Figure 1:
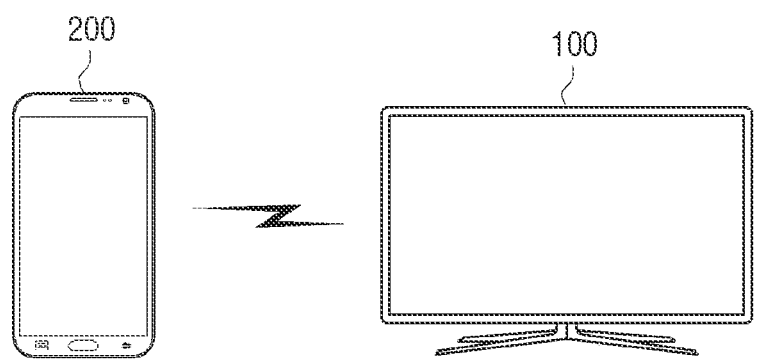
FIG. 1 is a diagram illustrating a proximity authentication system according to an embodiment.

The disclosure will be described with reference to a drawing including various embodiments. The disclosure includes various embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components.

In this document, the expressions "have," "may have," "including," or "may include" may be used to denote the presence of a feature (e.g., a component, such as a numerical value, a function, an operation, a part, or the like), and does not exclude the presence of additional features.

The expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

In addition, expressions "first", "second", or the like, used in the disclosure may indicate various components regardless of a sequence and/or importance of the components, will be used only in order to distinguish one component from the other components, and do not limit the corresponding components.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it may be understood that there is no other element (e.g., a third element) between the other elements.

Herein, the expression "configured to" may be used interchangeably with, for example, "suitable for," "having the capacity to," "designed to," "adapted to," "made to," or "capable of." The expression "configured to" does not necessarily mean "specifically designed to" in a hardware sense. Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

The electronic device according to various embodiments may include at least one of, for example, a desktop personal computer (PC), a laptop PC, a netbook computer, a workstation, a server, or a medical device. In some embodiments, the electronic device may include at least one of, for example, a television, a digital video disk (DVD) player, an audio system, a refrigerator, air-conditioner, a cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™), an electronic dictionary, an electronic key, a camcorder, or an electronic frame. In other embodiments, the electronic device may include at least one of a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), computed tomography (CT), or ultrasonic wave device, etc.), or an Internet of Things (IoT) device (e.g., light bulbs, sensors, sprinkler devices, fire alarms, thermostats, street lights, toasters, exercise equipment, hot water tanks, heater, boiler, etc.).

The external device according to various embodiments may be implemented as at least one of smartphones, tablet PCs, mobile phones, video telephones, a portable digital assistant (PDA), a portable multimedia player (PMP), an MP3 player, a camera, or a wearable device. For example, the wearable device may include any one or any combination of the accessory type (e.g., as a watch, a ring, a bracelet, a bracelet, a necklace, a pair of glasses, a contact lens or a head-mounted-device (HMD)); a fabric or a garment-embedded type (e.g., a skin pad or a tattoo); or a bio-implantable circuit.

In this disclosure, the term user may refer to a person using an electronic device or an external device or a device using an electronic device or an external device (e.g., artificial intelligence electronic device).

The disclosure will be described in greater detail with reference to drawings.

FIG. 1 illustrates a proximity authentication system, according to one embodiment of the disclosure. As illustrated in FIG. 1, a proximity authentication device may include an electronic device 100 and an external device 200. The electronic device 100 may be a device that is fixedly located in a specific space, and the external device 200 may be a device that is held or worn by a user.

The electronic device 100 and the external device 200 may communicate with each other through a first communication channel. The first communication channel may be a communication channel pre-authenticated between the electronic device 100 and the external device 200.

The electronic device 100 may identify at least one of the strength of the signal transmitted by the external device 200 and the use of the electronic device 100 during communication with the external device 200. When at least one of the strength of the signal transmitted by the external device 200 and the use of the electronic device 100 satisfies a predetermined condition, the electronic device 100 may request information about the movement state of the external device 200. The predetermined condition may be a condition where the signal strength change value is greater than or equal to a threshold value, a condition where the strength change value of the signal is below a threshold value, or a condition where the user does not use the electronic device 100.

The electronic device 100 may confirm a strength (e.g., received signal strength indication (RSSI)) of a signal transmitted by the external device 200 while performing communication with an external device 200. The electronic device 100 may confirm the strength change value of the signal transmitted by the external device 200. If the strength change value of the signal is greater than or equal to a threshold value, the electronic device 100 may request information about the movement state of the external device 200. The threshold value may be a predetermined value and may be a value to detect that the strength of the signal suddenly changes due to an attack from an external attacker (e.g., an attack of transmitting a signal with amplified signal strength). When the strength change value of the signal is below the threshold value, the electronic device 100 may periodically identify the state of use of the electronic device 100. If it is identified that the user does not use the electronic device 100, the electronic device 100 may request information about the movement state of the external device 200.

If it is identified that the user uses the electronic device 100, the electronic device 100 may confirm strength change of the signal transmitted by the external device 200 again.

The electronic device 100 may identify whether the external device 200 stops or moves based on information on the movement state of the external device 200 transmitted in response to the request. The information on the movement state of the external device 200 may be movement information of the external device 200 obtained by using a sensor (e.g., an acceleration sensor, a gyro sensor, a direction sensor, etc.) provided in the external device 200.

If it is identified that the external device moves based on information on the movement state of the external device 200, the electronic device 100 may transmit the authentication information to the external device 200 to authenticate the external device (or the proximity of the external device). The authentication information may include information on an authentication frequency and a hopping order of an ultrasonic signal outputted by the electronic device 100, wherein the authentication information may be transmitted using a pre-authenticated communication channel. If it is identified that the external device stops based on the information on the movement state of the external device 200, the electronic device 100 may confirm the strength change of the signal transmitted by the external device 200 again.

After identification that the strength of the signal transmitted by the external device 200 is identified to have a change which is greater than or equal to a threshold change or that the electronic device 100 is not used, and if it is identified that the electronic device 200 moves based on the information on the movement state received from the external device 200, the electronic device 100 may perform an operation to authenticate proximity of the external device.

The electronic device 100 may control the speaker to output an ultrasonic signal based on the authentication information to authenticate the proximity of the external device 200 using an ultrasonic signal. The electronic device 100 may output an ultrasonic signal based on an authentication frequency and a hopping order of an ultrasonic signal included in the authentication information.

The external device 200 may receive an ultrasonic signal outputted from the electronic device 100 through a microphone. The external device 200 may authenticate the electronic device 100 by comparing the frequency and hopping order of an ultrasonic signal inputted through a microphone with an authentication frequency and hopping order included in the authentication information received from the electronic device 100. The authentication using an ultrasonic signal is to authenticate that the electronic device 100 is located from the external device 200 within a proximity distance (e.g., within three meters (3M)) and may authenticate that the external device 200 is in proximity to the electronic device 100.

Based on obtaining an authentication result that the external device 200 is in proximity to the electronic device 100, the external device 200 may transmit the authentication result responsive to the ultrasonic signal to the electronic device 100.

The electronic device 100 may receive an authentication result responsive to an ultrasonic signal from the external device 200. Based on receiving an authentication result that the external device is in proximity to the electronic device while the state of the electronic device 100 is held in a locked state, the electronic device 100 may change the state of the electronic device to an unlocked state from the locked state.

By simultaneously authenticating the external device 200 and proximity of the external device 200 by the electronic device 100, the user may unlock the electronic device 100 by being proximity to the electronic device 100 while holding the external device, thereby releasing the locked state of the electronic device 100.

According to the above-described embodiment, the electronic device 100 may control a speaker to output an ultrasonic signal based on the authentication information, and the external device 200 may receive an ultrasonic signal through the microphone, but this is merely exemplary and the external device 200 may control the speaker to output an ultrasonic signal based on the authentication information, and the electronic device 100 may receive an ultrasonic signal through the microphone to identify the proximity authentication of the external device 200.

Figure 2A:
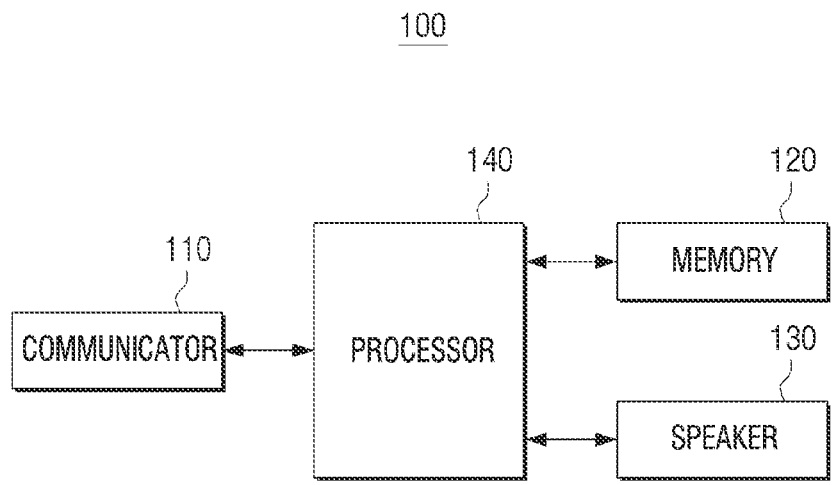
FIGS. 2A and 2B are block diagrams illustrating a configuration of an electronic device according to an embodiment.

Referring to FIG. 2A, the electronic device 100 may include a communicator 110, a memory 120, a speaker 130, and a processor 140. FIG. 2A is an exemplary view to implement embodiments of the disclosure and suitable hardware/software configurations in the level obvious to those skilled in the art may be additionally included in the electronic device 100 or the configurations of FIG. 2A may be omitted.

The communicator 110 may communicate with another external device using a wireless signal. The communicator 110 may perform wireless communication through an authenticated communication channel with the external device 200. The communicator 110 may transmit authentication information to the external device 200 for performing authentication using the ultrasonic signal, and may receive the authentication result from the external device 200.

The communicator 110 is configured to communicate with various types of external devices according to various types of communication methods. The communicator 110 may include a wireless communication chip such as a Wi-Fi chip, a Bluetooth chip, and the like. The processor 140 may perform communication with various external devices using the communicator 110. The communicator 110 may communicate with the external device 200 using various communication chips such as an infrared (IR) chip, a Zigbee chip, a near field communication (NFC) chip, or the like.

The memory 120 may store instruction or data related to at least one another element of the electronic device 100. The memory 120 may be implemented as a non-volatile memory, a volatile memory, a flash memory, a hard disk drive (HDD), a solid state drive (SSD), or the like. The memory 120 is accessed by the processor 130 and reading, writing, modifying, deleting, or updating of data by the processor 140 may be performed. In the disclosure, the term memory may include the memory 120, read-only memory (ROM) in the processor 140, random access memory (RAM), or a memory card (for example, a micro secure digital (SD) card, and a memory stick) mounted to the electronic device 100.

The speaker 130 may output an audio signal. The speaker 130 may output an ultrasonic signal of a non-audible band for the external device 200 to authenticate the electronic device 100. The ultrasonic signal may be output according to an authentication frequency and a hopping order included in the authentication information transmitted by the electronic device 100 to the external device 200. The speaker 130 may be provided in the electronic device 100, but it is only one embodiment and the speaker 130 may be electrically connected to the electronic device 100.

The processor 140 may be electrically connected to the communicator 110, the memory 120, and the speaker 130 to control the overall operation and function of the electronic device 100. The processor 140 may confirm at least one of the strength of the signal transmitted by the external device 200 and the use of the electronic device 100 while performing communication with the external device 200 through the communicator 110, and if at least one of the strength of the signal transmitted by the external device 200 and the use of the electronic device 100 satisfies a predetermined condition, the processor 140 may request information about the movement state of the external device 200. If it is identified that the external device moves based on information on the movement state of the external device 200, the processor 140 may control the communicator 110 to transmit the authentication information to authenticate the external device 200 to the external device 200. The processor 140 may control the speaker 130 to output an ultrasonic signal based on the authentication information, and may receive an authentication result responsive to an ultrasonic signal from the external device 200 through the communicator 110.

The processor 140 may confirm whether the strength change value of the signal is greater than or equal to a threshold value while performing communication with the external device 200. If the strength change value of the signal is greater than or equal to a threshold value, the electronic device 100 may request information about the movement state of the external device 200 to the external device 200. If a change value which is not ordinary is detected, the processor 140 may request information on the movement state of the external device 200 to the external device 200 to confirm the movement state of the external device 200.

Based on the strength change value of the signal being below the threshold value, the electronic device 100 may identify the state of use of the electronic device 100. The electronic device 100 may identify the state of use of the electronic device 100 based on whether the user interaction is detected for a predetermined time in the electronic device 100, whether the user is in proximity by using the sensor included in the electronic device 100. The electronic device 100 may identify the state of use of the electronic device 100 every predetermined period (e.g., ten seconds). If it is identified that the user does not use the electronic device 100, the electronic device 100 may request information about the movement state of the external device 200 to the external device 200.

If it is identified that the signal strength change value is less than a preset threshold value and the user uses the electronic device 100, the processor 140 may confirm again the strength of a signal transmitted by the external device 200.

The processor 140 may identify whether the external device 200 has stopped based on information on the movement state of the external device 200. The information on the movement state of the external device 200 may be information about movement of the external device 200 obtained from a sensor (e.g., an acceleration sensor, a gyro sensor, a direction sensor, etc.) included in the external device 200.

When it is identified that the external device 200 moves based on information on the movement state of the external device 200, the processor 140 may control the communicator 110 to transmit, to the external device 200, the authentication information to authenticate the electronic device 100 using an ultrasonic signal. The authentication information may be transmitted to the external device 200 through an authenticated channel. The authentication information may include an authentication frequency and a hopping order of an ultrasonic signal to be output by the electronic device 100.

After the authentication information is transmitted, the processor 140 may control the speaker 130 to output an ultrasonic signal according to an authentication frequency and a hopping order of an ultrasonic signal included in the authentication information. If an ultrasonic signal output from the electronic device is input based on an authentication frequency and a hopping order of an ultrasonic signal included in the authentication information in the external device 200, the external device 200 may obtain the result that the external device 200 is in proximity to the electronic device 100 as an authentication result.

The processor 140 may receive the authentication result from the external device 200 and identify that the external device 200 is in proximity. When an authentication result that the external device 200 is in proximity to the electronic device 100 is received while the state of the electronic device 100 is maintained in the locked state, the processor 140 may change the state of the electronic device 100 from the locked state to the unlocked state.

Figure 2B:
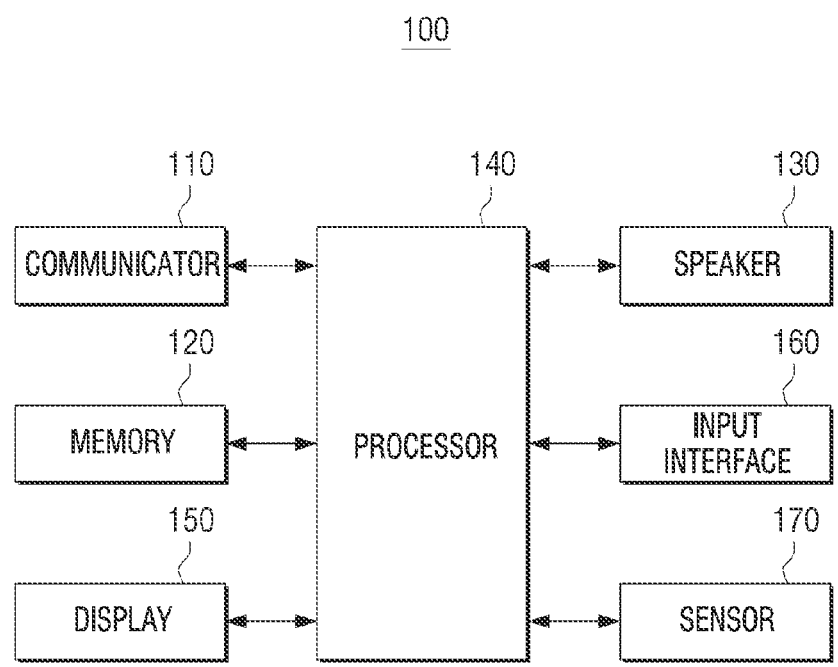

FIG. 2B is a block diagram illustrating a configuration of an electronic device in detail according to an embodiment. Referring to FIG. 2B, the electronic device 100 may include the communicator 110, the memory 120, the speaker 130, a display 150, an input interface 160, a sensor 170, and the processor 140. The communicator 110, the memory 120, the speaker 130, and the processor 140 have been illustrated in FIG. 2A and a duplicate description thereof will be omitted.

The display 150 may provide various screens. When the proximity authentication of the external device 200 is detected, the display 150 may provide an unlock screen by the control of the processor 140.

The input interface 160 may receive various user inputs and pass the same to the processor 140. The input interface 160 may include, for example, at least one of a touch panel, a (digital) pen sensor, a pressure sensor, a key, or a microphone. The touch panel may be used in relation to, for example, at least one of an electrostatic, a pressure-sensitive, infrared, or ultrasonic manner. The (digital) pen sensor may, for example, be part of a touch panel or include a separate recognition sheet. The key may include, for example, a physical button, an optical key, or a keypad. The input interface 160 may obtain an input signal according to a user input to be executed in an artificial intelligence-exclusive program.

The sensor 170 may detect various environment information. The electronic device 100 may include a sensor for identifying whether the user uses the electronic device 100. If the electronic device 100 is implemented with an Internet of Things (IoT) device, various sensors (e.g., temperature sensor, humidity sensor, fine dust sensor, illuminance sensor, or the like) for detecting environment information (e.g., temperature, humidity, fine dust, brightness, or the like) of the proximity of the electronic device 100 may be included.

Figure 3:
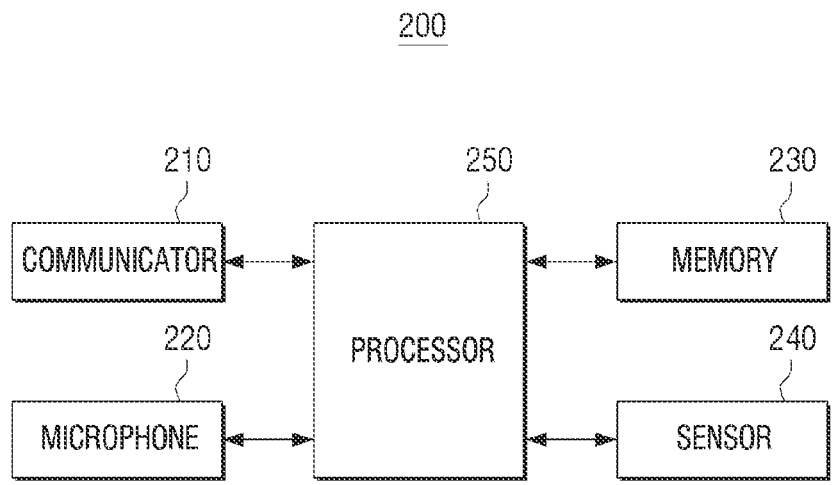
FIG. 3 is a block diagram illustrating an external device according to an embodiment.

FIG. 3 is a block diagram illustrating an external device according to an embodiment. As illustrated in FIG. 3, the external device 200 may include a communicator 210, a microphone 220, a memory 230, a sensor 240, and a processor 250. The configurations of FIG. 3 are merely exemplary to implement embodiments and hardware/software configurations suitable for those skilled in the art may be additionally included in the external device 200 or configurations of FIG. 3 may be omitted. The external device 200 according to an embodiment may be a device held or worn by the user.

The communicator 210 may communicate with the external device 100 using a wireless signal. The communicator 210 may perform a wireless communication through an authenticated communication channel with the electronic device 100. The communicator 210 may receive authentication information for performing authentication using an ultrasonic signal at the electronic device 100 and may transmit the authentication result to the electronic device 100.

The communicator 210 is configured to communicate with various types of external devices according to various types of communication methods. The communicator 210 may include a wireless communication chip such as a Wi-Fi chip and a Bluetooth chip. The communicator 110 may perform communication with the external device 200 through various communication chips such as the IR chip, the Zigbee chip, the NFC chip, or the like.

The microphone 220 may receive various audio signals. The microphone 220 may receive an ultrasonic signal outputted by the speaker 130 included in the electronic device 100. The microphone 220 may be provided in the external device 200, but it is only one embodiment and may be electrically connected to the external device 200.

The memory 230 may store a command or data related to at least one other elements of the external device 200. The memory 230 may be implemented as a non-volatile memory, a volatile memory, a flash memory, a hard disk drive (HDD), a solid state drive (SSD), or the like. The memory 230 is accessed by the processor 250 and reading/writing/modifying/deleting/updating of data by the processor 140 may be performed. In the disclosure, the term memory may include the memory 230, read-only memory (ROM) in the processor 250, random access memory (RAM), or a memory card (for example, a micro SD card, and a memory stick) mounted to the external device 200.

The sensor 240 may obtain data for detecting various information of the external device 200. The sensor 240 may include at least one of an acceleration sensor, a gyro sensor, and a direction sensor for detecting the movement of the external device 200. The processor 240 may detect the movement of the external device 200 using the sensing data obtained from at least one of an acceleration sensor, a gyro sensor, or a direction sensor.

The processor 250 may be electrically connected to the communicator 210, the microphone 220, the memory 230, and the sensor 240 to control the overall operation and function of the external device 200. When a signal requesting information about the movement state is received from the electronic device 100 through the communicator 210, the processor 250 may identify whether the external device 200 moves based on the sensing data obtained through the sensor 240. The processor 250 may control the communicator 250 to transmit information about the movement of the external device 200 to the electronic device 100. The processor 250 may transmit information about the movement of the external device 200, but it is only one embodiment and may transmit the sensing data itself obtained through the sensor 240. The processor 250 may obtain the sensing data through the sensor 240 in a predetermined period and may control the communicator 210 to transmit the sensing data already obtained when the information on the movement state is received from the electronic device 100.

The processor 250 may obtain authentication information from the electronic device 100 through the communicator 210. The authentication information may include authentication frequency and a hopping order of an ultrasonic signal to be outputted by the electronic device 100 for proximity authentication.

After receiving the authentication information, the processor 250 may obtain an ultrasonic signal output by the speaker 130 of the electronic device 100 through the microphone 240.

The processor 250 may compare the hopping order and the frequency of the ultrasonic signal output by the speaker 130 of the electronic device 100 with the hopping order and the authentication frequency included in the authentication information that has already been received to authenticate whether the external device 200 approaches the electronic device 100. If the frequency and hopping order of an ultrasonic signal output by the speaker 130 of the electronic device 100 are matched (or approximated) with an authentication frequency and the hopping order included in the authentication information already received, the processor 250 may obtain an authentication result indicating that the external device 200 is in proximity to the electronic device 100. The processor 250 may control the communicator 210 to transmit the authentication result to the electronic device 100.

Figure 4:
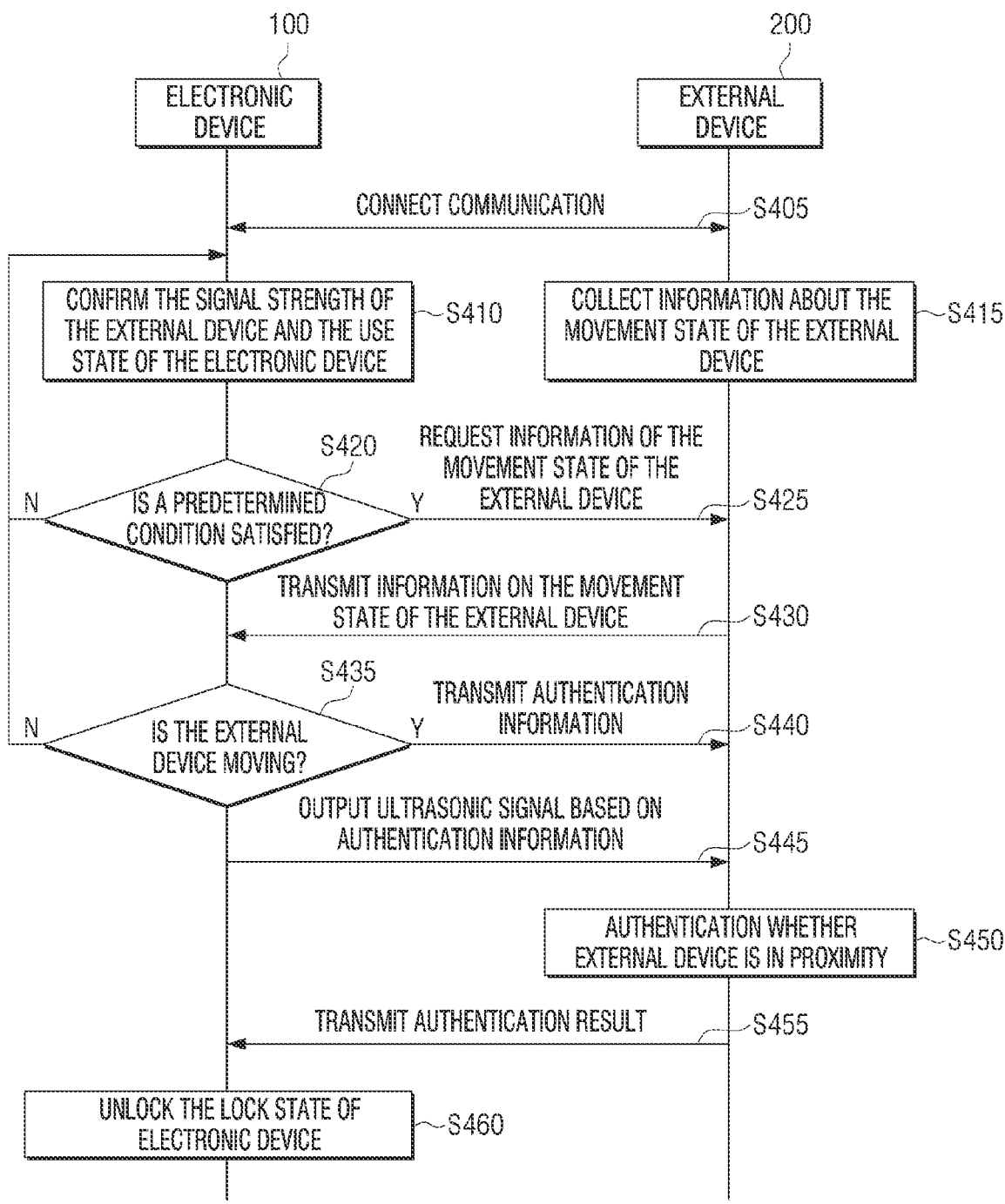
FIG. 4 is a sequence diagram illustrating a method of proximity authentication of a proximity authentication system according to an embodiment.

FIG. 4 is a sequence diagram illustrating a method of proximity authentication of a proximity authentication system according to an embodiment.

The electronic device 100 and the external device 200 may perform a communication connection in operation S405. The electronic device 100 and the external device 200 may perform a communication connection using a Bluetooth communication or Wi-Fi communication, and the communication connection between the electronic device 100 and the external device 200 may be a communication connection performed by an authenticated communication channel. For example, while the electronic device 100 broadcasts a beacon signal including information of the electronic device, the external device 200 may search the electronic device 100 based on the beacon signal broadcasted by the electronic device 100 and may authenticate the electronic device 100 based on the authentication information (e.g., password information, etc.) corresponding to the searched electronic device 100 input by the user.

While communicating with the external device 200, the electronic device 100 may confirm the signal strength of the external device 200 and the use state of the electronic device 100 in operation S410.

The electronic device 100 may identify whether the signal strength change value of the external device 200 and the use state of the electronic device 100 satisfies a predetermined condition in operation S420. The predetermined condition may be a condition where the signal strength change value of the external device 200 is greater than or equal to a threshold value or where the signal strength change value of the external device 200 is less than a threshold value and the user does not use the electronic device 100.

If the preset condition is not satisfied in operation S420-N, the electronic device 100 may confirm the use state of the electronic device 100 and the signal strength of the external device 200 in operation S410.

The predetermined condition is satisfied in operation S420-Y, the electronic device 100 may request information of the movement state of the external device 200 to the external device 200 in operation S425.

The external device 200 may collect information about the movement state of the external device 200 in operation S415. The external device 200 may collect information on the movement state of the external device 200 by using the sensor included in the external device 200. Referring to FIG. 4, the external device 200 may periodically collect information on the movement state of the external device 200 before the electronic device 100 requests information about the movement state of the external device 200, but this is only one embodiment, and may request information on the movement state and then collect information on the movement state of the external device 200.

The external device 200 may transmit information on the movement state of the external device 200 to the electronic device 100 in operation S430. The external device 200 may transmit information on the movement state to the electronic device 100 using the already authenticated communication channel.

The electronic device 100 may identify whether the external device 200 is moving based on the information about the movement state of the external device 200 in operation S435.

If it is identified that the external device 200 stops in operation S435-N, the electronic device 100 may confirm the use state of the electronic device 100 and the signal strength of the external device 200 in operation S410.

If it is identified that the external device 200 is moving in operation S435-Y, the electronic device 100 may transmit the authentication information to the external device 200 to authenticate the proximity of the external device 200 in operation S440. The authentication information is information for authenticating the proximity of the external device 200 by using an ultrasonic signal, and may include at least one of an authentication frequency and a hopping order of the ultrasonic signal.

Figure 6:
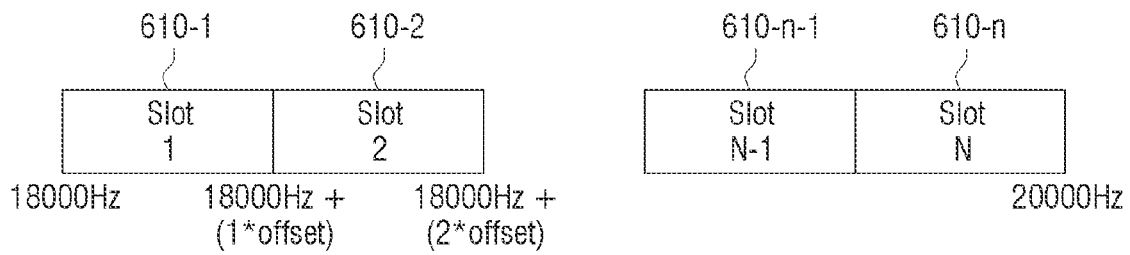
FIG. 6 is a diagram illustrating an ultrasonic signal for proximity authentication according to an embodiment.

The ultrasonic signal may be a signal having a non-audible band, and may be a signal between 18000 Hz and 20000 Hz, as shown in FIG. 6, and may allot N slots 610-1, 610-2, . . . 610-n. For example, when ten slots are included, a slot may be allocated on a basis of 200 Hz. The electronic device 100 may determine an authentication frequency band and a hopping order required for the proximity authentication to generate authentication information. For example, when a frequency band is allocated to the tenth slot, the electronic device 100 may generate authentication information, which sequentially outputs a fifth ultrasonic signal in the order of a first ultrasonic signal included in the first slot→a second ultrasonic signal included in a third slot→a third ultrasonic signal included in a fifth slot→a fourth ultrasonic signal included in a seventh slot→and a fifth ultrasonic signal included in a ninth slot. The electronic device 100 may transmit the generated authentication information to the external device 200. The authentication information may be transmitted through a pre-authenticated communication channel.

The electronic device 100 may output an ultrasonic signal based on the authentication information in operation S445. The electronic device 100 may output an ultrasonic signal based on an authentication frequency and a hopping order of an ultrasonic signal included in the authentication information. For example, when information to output the first ultrasonic signal included in the first slot→the second ultrasonic signal included in the third slot→the third ultrasonic signal included in the fifth slot→the fourth ultrasonic signal included in the seventh slot→and the fifth ultrasonic signal included in the ninth slot in order is included in the authentication information, the electronic device 100 may sequentially output the first ultrasonic signal included in the first slot→the second ultrasonic signal included in the third slot→the third ultrasonic signal included in the fifth slot→the fourth ultrasonic signal included in the seventh slot→and the fifth ultrasonic signal included in the ninth slot.

The external device 200 may authenticate the proximity of the external device 200 based on an ultrasonic signal outputted by the electronic device 100 in operation S450. If it is identified that the electronic device 100 sequentially outputs an ultrasonic signal in the order of the authentication frequency and hopping order included in the received authentication information, the external device 200 may identify that the external device 200 is in proximity to the electronic device 100, and if it is identified that the electronic device 100 outputs an ultrasonic signal in order different from the authentication frequency and the hopping order included in the received authentication information, it may be identified that the external device 200 is not in proximity to the electronic device 100.

The external device 200 may transmit the authentication result to the electronic device 100 in operation S455. The authentication result may be transmitted through the authenticated communication channel.

Figure 7:
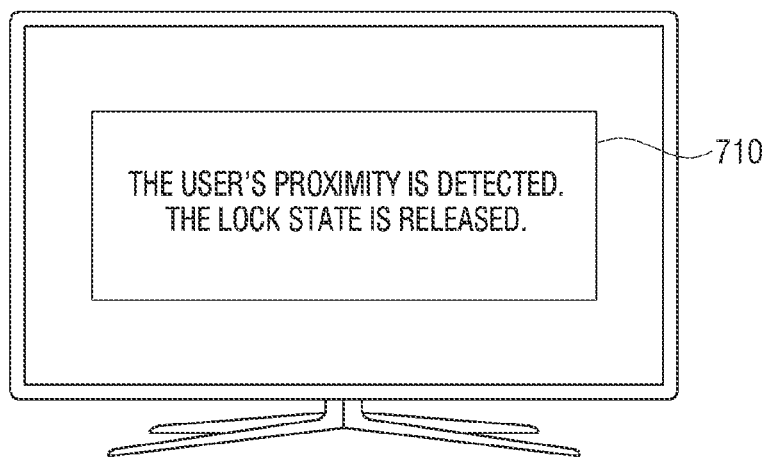
FIG. 7 is a diagram illustrating an unlock screen of an electronic device according to an embodiment.

The electronic device 100 may release the lock state of the electronic device 100 based on the authentication result in operation S460. When an authentication result in which the external device 200 is in proximity to the electronic device 100 is received while the electronic device 100 maintains a locked state, the electronic device 100 may release the lock state of the electronic device 100. As shown in FIG. 7, the electronic device 100 may provide a message 710 indicating that the lock state of the electronic device 100 is released according to the proximity of the user. The electronic device 100 may provide a visual message, as shown in FIG. 7, but this is only one embodiment, and may provide an audible message using audio or a tactile message using vibration. If it is authenticated that the external device 200 is in proximity to the electronic device 100, the external device 200 may also provide a message guiding that the external device 200 is in proximity to the electronic device 100.

As described above, by authenticating that the external device 200 held by the user is in proximity to the electronic device 100 based on information on the movement state of the external device 200 obtained by using the sensor included in the external device 200, the user may unlock the electronic device 100 more safely and conveniently.

Figure 5:
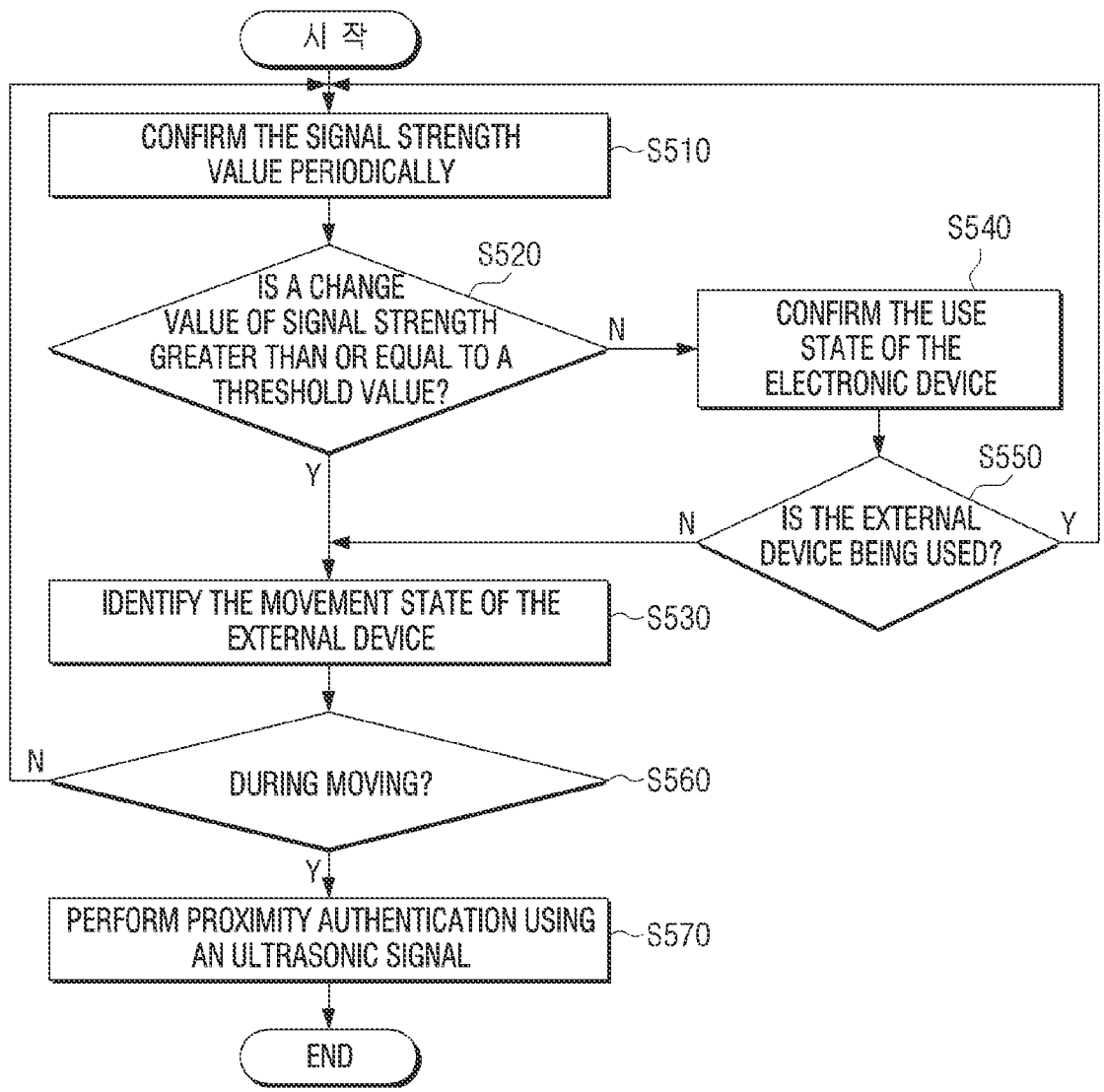
FIG. 5 is a diagram illustrating a method of identifying a movement state of an external device to identify whether proximity authentication is necessary according to an embodiment.

FIG. 5 is a diagram illustrating a method of identifying a movement state of an external device to identify whether proximity authentication is necessary according to an embodiment. FIG. 5 is a diagram illustrating the steps of S410 to S435 of FIG. 4 in greater detail.

The electronic device 100 may confirm the signal strength value of the external device 200 periodically in operation S510. The signal strength value may be an RSSI value.

The electronic device 100 may confirm whether a change value of signal strength is greater than or equal to a threshold value in operation S520. The threshold value may be a value that may be changed by an attack from an external attacker rather than a general change value.

If the change value of the signal strength is greater than or equal to the threshold value in operation S520-Y, the electronic device 100 may identify the movement state of the external device 200 in operation S530. The electronic device 100 may request information about the movement state to the external device 200 and receive information on the movement state obtained from the sensor included in the external device 200 to identify the movement state of the external device 200.

If it is identified that the external device 200 is moving in operation S560-Y, the electronic device 100 may perform proximity authentication using an ultrasonic signal in operation S570. The electronic device 100 may perform the step 460 in step S440 of FIG. 4.

If it is identified that the external device 200 is not moving but is stopped in operation S560-N, the electronic device 100 may periodically confirm the signal strength value of the external device 200 in operation S510.

If it is identified that the signal strength value is less than a threshold value in operation S520-N, the electronic device 100 may confirm the use state of the electronic device 100 in operation S540. The electronic device 100 may confirm the use state of the electronic device 100 based on whether user interaction is input to the electronic device 100 within a threshold time, whether a screen is displayed on the electronic device 100, whether the user is in proximity through a sensor included in the electronic device 100, or the like.

If the electronic device is identified to be in use in operation S550-Y, the electronic device 100 may periodically identify the signal strength value of the external device 200 in operation S510. If it is identified that the electronic device 100 is not in use in operation S550-N, the electronic device 100 may identify the movement state of the external device 200 in operation S530 and determine whether the proximity authentication is performed using the ultrasonic signal.

As described above, by determining the proximity authentication based on the movement state information identified through the sensor of the external device 200 as well as the change value of the signal strength, the user may more safely perform the proximity authentication despite the attack from an external attacker.

The external attacker may perform attack through circumstances as shown below.

According to one embodiment, there may be an embodiment in which an attacker may amplify and attack the strength of a wireless signal when an actual external device 200 exists at far distance. The electronic device 100 may request information about the movement state of the external device 200 to the external device 200 by the signal strength amplified by an external attacker. If information on the movement state of moving is received from the external device 200, the electronic device 100 may perform the proximity authentication of the external device 200. The external device 200 is located far, even if the ultrasonic signal is output to the external device 200, the ultrasonic signal may not reach the external device 200 located far and thus, the external device 200 may transmit, to the electronic device 100, the authentication result indicating that the external device 200 is not in proximity to the electronic device 100. Accordingly, the electronic device 100 may not perform the proximity authentication despite attack from an external attacker.

According to another embodiment, there may be an embodiment in which an external attacker continues to attack in response to the same frequency by sniffing an ultrasonic signal. Since the ultrasonic signal of the same frequency continues to be output, the external device 200 may identify that the ultrasonic signal is not transmitted from the authentication information received from the electronic device 100 and may transmit the authentication result that the external device 200 is not proximity to the electronic device 100 to the electronic device 100.

According to still another embodiment, there may be an embodiment in which an external attacker prevents proximity authentication using an ultrasonic signal with a noise ultrasound signal. The electronic device 100 may transmit a present communication state (that is, a communication state where a noise ultrasonic signal is present) of an ultrasonic signal to the external device 200 through an authenticated communication channel, and the external device 200 may display a user interface (UI) asking the user whether to unlick the electronic device 100. When a user command requesting unlocking of the electronic device 100 is input through the external device 200, the external device 200 may request the unlocking to the electronic device 100, and the electronic device 100 may perform unlocking.

According to one embodiment, the electronic device 100 and the external device 200 may perform unlocking of the electronic device 100 through safe proximity authentication even when an attack of various forms is performed.

FIG. 8 is a flowchart illustrating a controlling method of an electronic device according to an embodiment.

The electronic device 100 may confirm at least one of the strength of the signal transmitted by the external device 200 and the usage of the electronic device 100 while communicating with the external device 200 in operation S810.

The electronic device 100 may identify whether at least one of the strength of the signal transmitted by the external device 200 and the use of the electronic device 100 satisfies a predetermined condition in operation S820. The predetermined condition may be a condition where the strength change value of the signal transmitted by the external device 200 is greater than or equal to the threshold or the strength change value of the signal transmitted by the external device 200 is less than a threshold value or the electronic device 100 is not being used.

If the predetermined condition is satisfied, the electronic device 100 may request information about the movement state of the external device 200 in operation S830. The movement state of the external device 200 may be information detected by the sensor included in the external device 200.

The electronic device 100 may identify whether the external device 200 is moving based on the information about the movement state of the external device 200 in operation S840.

If the external device 200 is identified to be moving, the electronic device 100 may transmit authentication information to authenticate the external device 200 to the external device 200 in operation S850. At least one of an authentication frequency and a hopping order of an ultrasonic signal may be included in the authentication information.

The electronic device 100 may transmit an ultrasonic signal to the external device 200 based on the authentication information in operation S860. The external device 200 may identify whether an ultrasonic signal outputted by the electronic device 100 is output by a frequency and a hopping order included in the authentication information and may perform proximity authentication of the external device 200.

The electronic device 100 may receive an authentication result responsive to the ultrasonic signal from the external device in operation S870. The electronic device 100 may release the locking state of the electronic device 100 based on the authentication result.

Various embodiments of the disclosure may be implemented in software, including instructions stored on machine-readable storage media readable by a machine (e.g., a computer). An apparatus may call instructions from the storage medium, and execute the called instruction, including an electronic apparatus (e.g., air conditioner 100) according to the disclosed embodiments. When the instructions are executed by a processor, the processor may perform a function corresponding to the instructions directly or by using other components under the control of the processor. The instructions may include code generated by a compiler or a code executable by an interpreter. A machine-readable storage medium may be provided in the form of a non-transitory storage medium. Herein, the term "non-transitory" denotes that a storage medium does not include a signal but is tangible, and does not distinguish the case in which a data is semi-permanently stored in a storage medium from the case in which a data is temporarily stored in a storage medium.

According to embodiments, a method disclosed herein may be provided in software of a computer program product. A computer program product may be traded between a seller and a purchaser as a commodity. A computer program product may be distributed in the form of a machine readable storage medium (e.g., CD-ROM) or distributed online through an application store (e.g., PlayStore™). In the case of on-line distribution, at least a portion of the computer program product software may be stored temporarily or at least temporarily in a storage medium such as a manufacturer's server, a server in an application store, or a memory in a relay server.

Further, each of the components (e.g., modules or programs) according to the above-described various embodiments may be composed of one or a plurality of entities, and some subcomponents of the above-mentioned subcomponents may be omitted, or other subcomponents may be further included in various embodiments. Alternatively or additionally, some components (e.g., modules or programs) may be integrated into one entity to perform the same or similar functions performed by each respective component prior to integration. Operations performed by a module, program, or other component, in accordance with various embodiments, may be performed sequentially, in a parallel, repetitive, or heuristically manner, or at least some operations may be performed in a different order, omitted, or other operations may be added.

What is claimed is:

1. A method for controlling of an electronic device, comprising:
    confirming at least one of a strength of a signal transmitted by an external device and whether the electronic device is being used during communication with the external device;
    based on at least one of the strength of the signal transmitted by the external device or whether the electronic device is being used satisfying a predetermined condition, requesting information relating to a movement state of the external device;
    based on the external device being identified as moving based on information on the movement state of the external device, transmitting authentication information for authenticating the external device to the external device;
    outputting an ultrasonic signal based on the authentication information; and
    receiving an authentication result in response to the ultrasonic signal from the external device,
    wherein the requesting comprises, based on a strength change value of the signal being less than a threshold value, identifying a use state of the electronic device, and based on the strength change value of the signal being greater than or equal to a threshold value, requesting information relating to a movement state of the external device.

2. The method of claim 1, wherein the requesting comprises, based on identification that a user does not use the electronic device, requesting information relating to the movement state of the external device.

3. The method of claim 1, comprising:
    based on identification that the external device stops based on information relating to the movement state of the external device, detecting a strength of a signal transmitted by the external device.

4. The method of claim 1, wherein the information relating to the movement state of the external device is identified based on at least one of an acceleration sensor, a gyro sensor, or a direction sensor included in the external device.

5. The method of claim 1, wherein the electronic device and the external device perform communication through a pre-authenticated channel, and
    wherein the authentication information is transmitted to the external device through the authenticated channel.

6. The method of claim 1, wherein the authentication information comprises an authentication frequency and a hopping order of the ultrasonic signal,
    wherein the outputting the ultrasonic signal comprises outputting the ultrasonic signal through a speaker according to the authentication frequency and the hopping order of the ultrasonic signal.

7. The method of claim 6, wherein the external device, based on the ultrasonic signal output from the electronic device being input based on the authentication frequency and the hopping order of the ultrasonic signal included in the authentication information, authenticates the proximity to the electronic device.

8. The method of claim 7, comprising:
    based on receiving an authentication result in which the external device is identified as being in proximity to the electronic device while the electronic device maintains a lock state, changing a state of the electronic device from a lock state to an unlock state.

9. An electronic device comprising:
    a communicator configured to perform communication using a wireless signal;
    a speaker configured to output an ultrasonic signal;
    a memory configured to store at least one instruction; and
    a processor, connected to the communicator and the memory, configured to control the electronic device,
    wherein the processor, by executing the at least one instruction, is further configured to:
    confirm at least one of a strength of a signal transmitted by an external device and whether the electronic device is being used during communication with the external device,
    based on at least one of the strength of the signal transmitted by the external device or whether the electronic device is being used satisfying a predetermined condition, request information related to a movement state of the external device,
    based on the external device being identified as moving based on information on the movement state of the external device, control the communicator to transmit authentication information for authenticating the external device to the external device,
    control the speaker to output an ultrasonic signal based on the authentication information, and
    receive an authentication result in response to the ultrasonic signal from the external device,
    wherein the processor is further configured to, based on a strength change value of the signal being less than a threshold value, identify a use state of the electronic device and based on the strength change value of the signal being greater than or equal to a threshold value, request information about a movement state of the external device.

10. The electronic device of claim 9, wherein the processor is further configured to, based on identification that a user does not use the electronic device, request information relating to the movement state of the external device.

11. The electronic device of claim 9, wherein the processor is further configured to, based on identification that the external device stops based on information relating to the movement state of the external device, detect a strength of a signal transmitted by the external device.

12. The electronic device of claim 9, wherein the information relating to the movement state of the external device is identified based on at least one of an acceleration sensor, a gyro sensor, or a direction sensor included in the external device.

13. The electronic device of claim 9, wherein the electronic device and the external device perform communication through a pre-authenticated channel using the communicator, and
   wherein the authentication information is transmitted to the external device through authenticated channel.

* * * * *